(12) United States Patent
Hsu et al.

(10) Patent No.: US 11,097,906 B1
(45) Date of Patent: Aug. 24, 2021

(54) LIQUID WITHDRAWAL SYSTEM

(71) Applicant: ASIA IC MIC-PROCESS, INC., Taipei (TW)

(72) Inventors: Hung-Hsin Hsu, Taipei (TW); Yan-Lan Chiou, Taipei (TW)

(73) Assignee: ASIA IC MIC-PROCESS, INC., Taipei (TW)

( * ) Notice: Subject to any disclaimer, the term of this patent is extended or adjusted under 35 U.S.C. 154(b) by 0 days.

(21) Appl. No.: 16/861,237

(22) Filed: Apr. 29, 2020

(51) Int. Cl.
*B65G 49/00* (2006.01)
*B65D 88/56* (2006.01)
*B67D 3/00* (2006.01)
*B65G 65/24* (2006.01)
*B22D 41/06* (2006.01)

(52) U.S. Cl.
CPC ............ *B65G 49/00* (2013.01); *B22D 41/06* (2013.01); *B65D 88/56* (2013.01); *B65G 65/24* (2013.01); *B67D 3/0083* (2013.01)

(58) Field of Classification Search
CPC ........ B65G 49/00; B65G 65/23; B65G 65/24; B67D 3/0083; B67D 3/0051; B67D 3/0054; B67D 3/0067; B67D 88/56; B65B 11/045; G01G 19/00; G01G 17/06; G01G 19/007; B65D 2231/005; B65D 88/56; B22D 41/06; F16M 11/08; F16M 11/2014; F16M 11/10
See application file for complete search history.

(56) References Cited

U.S. PATENT DOCUMENTS

| | | | | |
|---|---|---|---|---|
| 453,856 | A * | 6/1891 | Christy et al. ...... | B62B 2202/02 248/129 |
| 990,717 | A * | 4/1911 | Fagan ................... | F16M 11/08 248/131 |
| 7,869,963 | B2 * | 1/2011 | Nelson .................. | G01G 17/06 702/45 |

* cited by examiner

Primary Examiner — Gregory W Adams

(57) ABSTRACT

A liquid withdrawal system includes a base, at least one motion-enhancing element, a plurality of grip elements and a clamp. The base has a load-carrying surface and a rotational axis. The rotational axis is perpendicular to the load-carrying surface. The base is rotatable relative to the rotational axis. The motion-enhancing element is disposed on the load-carrying surface. The clamp is disposed opposite the load-carrying surface. The base and clamp jointly define a receiving space. The receiving space is adapted to receive a liquid barrel. The grip elements are movably connected to the base and symmetrically positioned relative to the base.

8 Claims, 7 Drawing Sheets

LIQUID WITHDRAWAL SYSTEM

BACKGROUND OF THE INVENTION

1. Field of the Invention

The present disclosure relates to liquid withdrawal systems, and in particular to a liquid withdrawal system for assisting a liquid barrel in moving to a specific point on a load-carrying surface.

2. Description of the Related Art

The manufacturing processes performed in the semiconductor and precision electronics industries require chemical liquids, such as polishing solutions and detergents, for use in a flattening process or to cleanse related manufacturing devices. After their use, the chemical liquids are temporarily stored in chemical solution barrels. After the chemical liquids in chemical solution barrels has accumulated to be of a certain amount, the chemical liquids are removed from the chemical solution barrels either by hand or by a means of liquid withdrawal. However, the liquid barrels are usually too heavy to be moved by hand to a carrying table dedicated to liquid withdrawal. Furthermore, conventional carrying tables are mostly stationary; as a result, in case of an error about the position of the lid of the liquid barrel relative to a clamp for use with liquid withdrawal, manual correction must be carried out in the deviation direction with a view to moving the liquid barrel to a position that facilitates the liquid withdrawal process performed with the clamp. In view of this, the prior art is disadvantaged by a lack of ease of use.

BRIEF SUMMARY OF THE INVENTION

An objective of the present disclosure is to provide a liquid withdrawal system capable of assisting a liquid barrel in moving to a specific point on a load-carrying surface with reduced manpower and enhanced ease of use.

The first aspect of the present disclosure provides a liquid withdrawal system, comprising a base, at least one motion-enhancing element, a plurality of grip elements and a clamp. The base has a load-carrying surface and a rotational axis. The rotational axis is perpendicular to the load-carrying surface. The base is rotatable relative to the rotational axis. The motion-enhancing element is disposed on the load-carrying surface. The grip elements are movably connected to the base and symmetrically positioned relative to the base. The clamp is disposed opposite the load-carrying surface. The base and clamp jointly define a receiving space. The receiving space is adapted to receive a liquid barrel.

The second aspect of the present disclosure provides another liquid withdrawal system, comprising a base, at least one motion-enhancing element and a plurality of grip elements. The base has a load-carrying surface and a rotational axis. The rotational axis is perpendicular to the load-carrying surface. The base is rotatable relative to the rotational axis. The motion-enhancing element is disposed on the load-carrying surface. The grip elements are movably connected to the base and symmetrically positioned relative to the base.

In an embodiment, the liquid withdrawal system further comprises a plurality of screws. The screws are arranged radially on the base. The rotational axis is positioned in the direction of extension of the screws. The grip elements each comprise a central portions and a plurality of end portions. The screws are connected to the base and the central portions. The distance between each said central portion and a center of the base is less than the distance between each said end portion and the center, wherein each said end portion has a rotating element, and each said rotating element has a height difference relative to the load-carrying surface.

In an embodiment, the motion-enhancing element is a unidirectional roller, omnidirectional roller, rolling element or caterpillar.

In an embodiment, the liquid withdrawal system further comprises a limiting element connected to the base and clamp and corresponding in shape to the liquid barrel.

In an embodiment, liquid withdrawal system further comprises an inclination mechanism pivotally connected to the ground, wherein the base is disposed on the inclination mechanism.

In an embodiment, an end of the inclination mechanism has a connection portion, wherein the base is disposed on the inclination mechanism and positioned distal to the end thereof, wherein the base and the inclination mechanism are oblique to the ground at an angle when the end is in contact with the ground.

In an embodiment, the load-carrying surface is adapted to carry a liquid barrel, and the base further comprises a sensing unit, wherein the sensing unit deforms physically or generates an electronic signal as soon as the load-carrying surface carries the liquid barrel.

In an embodiment, the liquid withdrawal system further comprises a limiting element connected to the base and corresponding in shape to the liquid barrel, wherein load-carrying surface is adapted to carry a liquid barrel.

Therefore, the liquid withdrawal system of the present disclosure is capable of assisting a liquid barrel in moving to a specific point on a load-carrying surface with a motion-enhancing element thereon. With its base being rotatable relative to the rotational axis, the liquid withdrawal system of the present disclosure dispenses users with the need to move but allows the users to move the liquid barrel to a specific point by exerting a force on the rotatable base. Therefore, the liquid withdrawal system of the present disclosure requires little manpower and demonstrates enhanced ease of use.

DETAILED DESCRIPTION OF THE INVENTION

Figure 1:
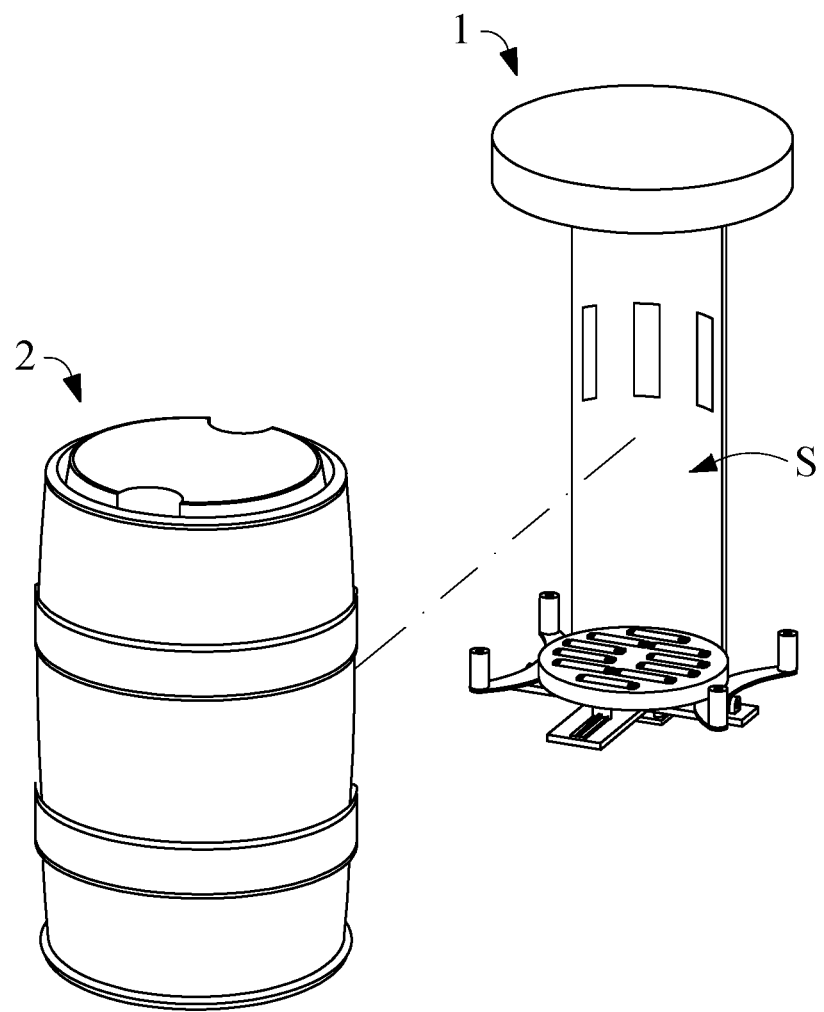
FIG. 1 is a schematic view of synergy between a liquid withdrawal system and a liquid barrel according to an embodiment of the present disclosure.

To facilitate understanding of the object, characteristics and effects of this present disclosure, embodiments together with the attached drawings for the detailed description of the present disclosure are provided.

All technical terms used herein are exemplary, descriptive terms comprehensible to persons skilled in the art. Directional expressions used herein, such as "upward," "downward," "leftward," "rightward," "front," "rear", and the like are exemplary, descriptive terms which must be interpreted from a layman's perspective and must not be restrictive of the appended claims of the present disclosure. Moreover, identical or similar reference numerals used in the embodiments denote identical or similar components.

Figure 2:
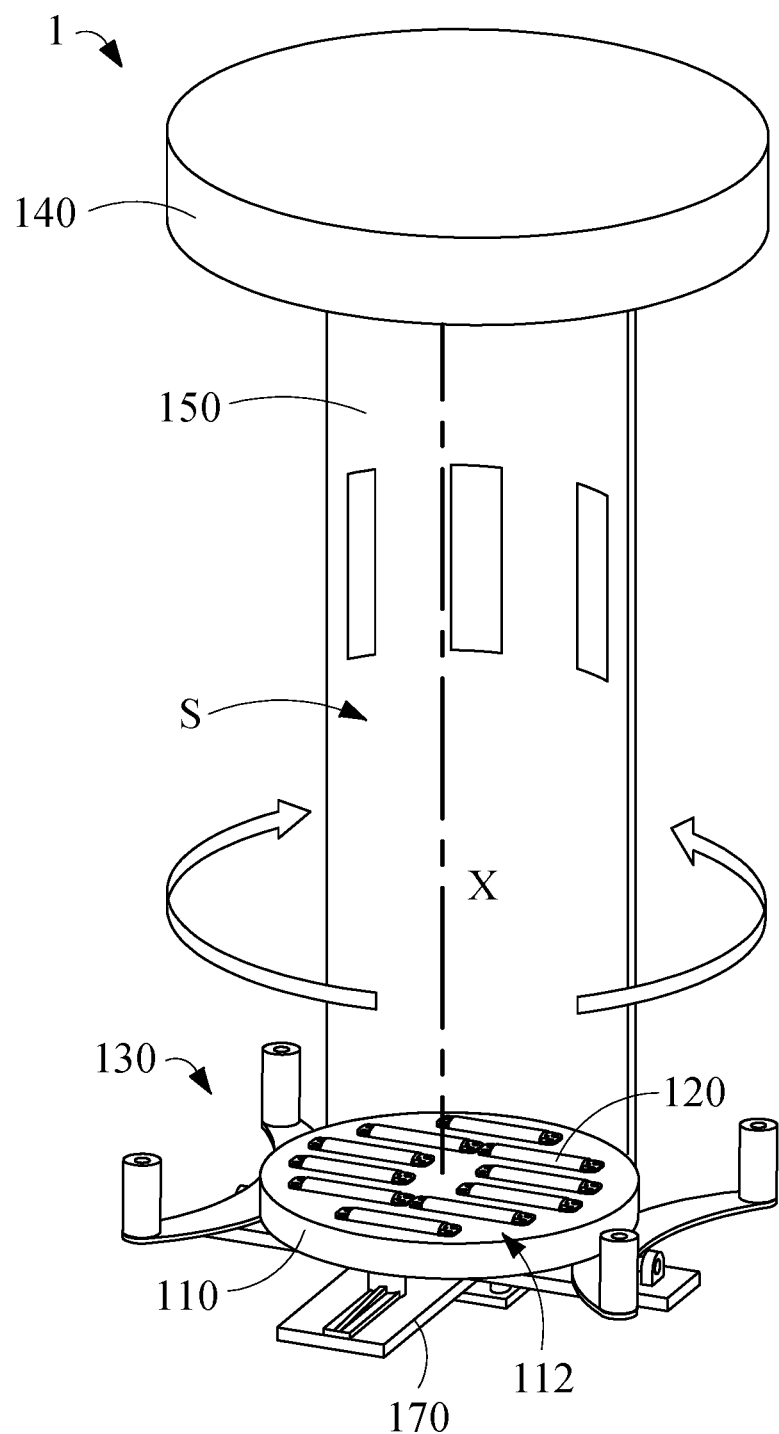
FIG. 2 is a perspective view of the liquid withdrawal system shown in FIG. 1.

Refer to FIG. 1 and FIG. 2. FIG. 1 is a schematic view of synergy between a liquid withdrawal system and a liquid barrel according to an embodiment of the present disclosure. FIG. 2 is a perspective view of the liquid withdrawal system shown in FIG. 1. In this embodiment, a liquid withdrawal system 1 comprises a base 110, at least one motion-enhancing element 120 and a plurality of grip elements 130. The base 110 has a load-carrying surface 112 and a rotational axis X. The rotational axis X is perpendicular to the load-carrying surface 112. The base 110 is rotatable relative to the rotational axis X. The motion-enhancing element 120 is disposed on the load-carrying surface 112. The grip elements 130 are movably connected to the base 110 and symmetrically positioned relative to the base 110. Preferably, the liquid withdrawal system 1 further comprises a clamp 140. The clamp 140 is disposed opposite the load-carrying surface 112. The base 110 and the clamp 140 jointly define a receiving space S. The receiving space S is adapted to receive a liquid barrel 2.

In this embodiment, the base 110 is a rotatable table capable of rotating relative to the rotational axis X clockwise or counterclockwise freely. The load-carrying surface 112 is adapted to carry the liquid barrel 2. Preferably, in this embodiment, the liquid withdrawal system 1 further comprises a limiting element 150. The limiting element 150 is connected to the base 110 and the clamp 140 and thus functions as a connection component between the base 110 and the clamp 140. In this embodiment, the limiting element 150 is an arcuate baffle and corresponds in shape to the liquid barrel 2, whereas the base 110 is pivotally connected to the bottom of the limiting element 150. Consequently, when the liquid barrel 2 is pushed onto the load-carrying surface 112 under a force inadvertently great enough to cause the liquid barrel 2 to deviate from its position, the limiting element 150 can confine the liquid barrel 2 to its position and thus prevent the liquid barrel 2 from sliding off the base 110.

In this embodiment, the liquid withdrawal system 1 assists users in moving the liquid barrel 2 onto the base 110.

Figure 3:
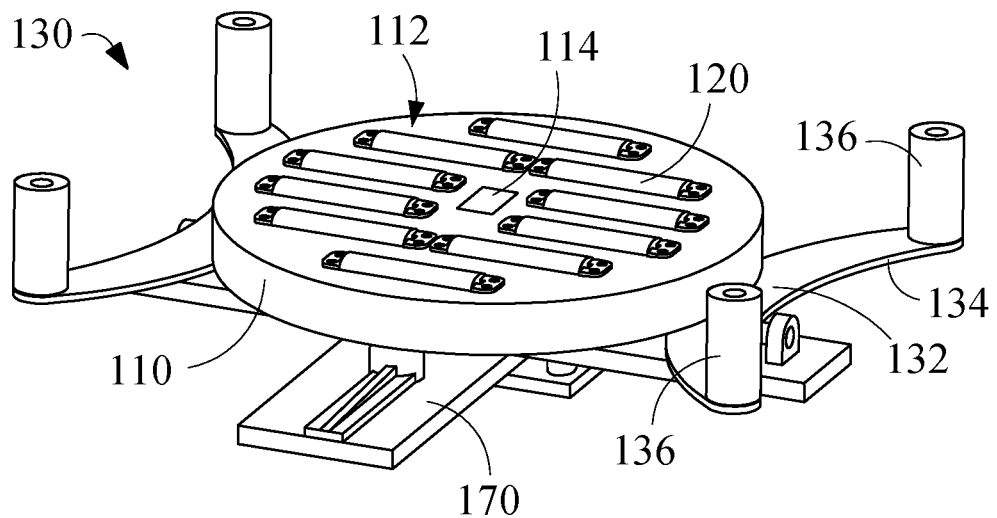
FIG. 3 is a perspective view of underlying elements of the liquid withdrawal system shown in FIG. 2.
Figure 4:
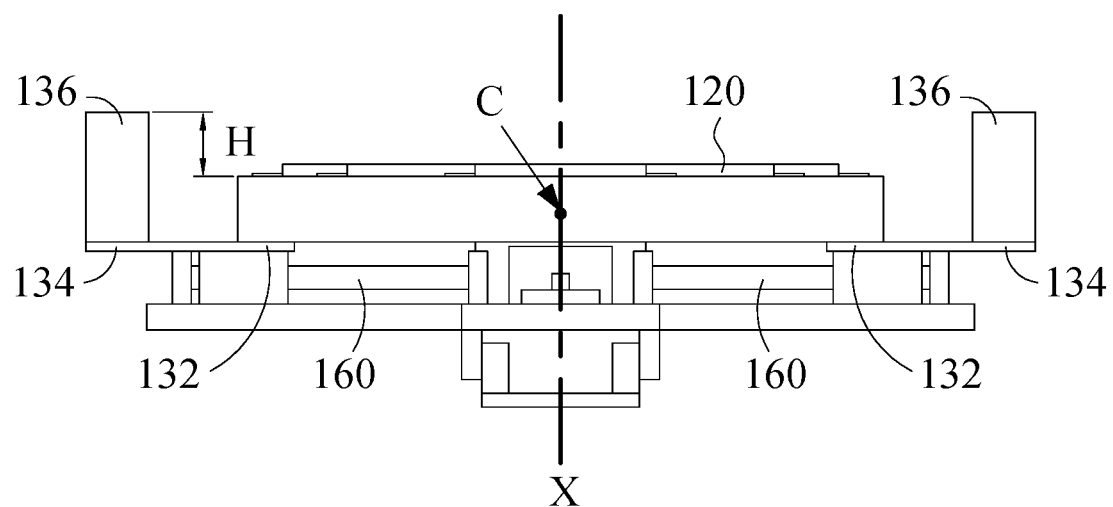
FIG. 4 is a front view of the underlying elements shown in FIG. 3.

Refer to FIG. 3 and FIG. 4. FIG. 3 is a perspective view of underlying elements of the liquid withdrawal system shown in FIG. 2. FIG. 4 is a front view of the underlying elements shown in FIG. 3. The load-carrying surface 112 has thereon at least one motion-enhancing element 120. In this embodiment, the motion-enhancing element 120 is a unidirectional roller and is in the number of ten. When the users move part of the liquid barrel 2 away from the edge of the base 110 and rest it on the load-carrying surface 112, the rolling of the motion-enhancing element 120 enables the liquid barrel 2 to slide smoothly to a specific point (for example, the center) on the load-carrying surface 112. Moreover, with the base 110 being capable of rotating relative to the rotational axis X freely, regardless of the direction in which the users want to move the liquid barrel 2 onto the base 110, the users can rotate the base 110 before or during the movement and thus gain access to the assistance from the motion-enhancing element 120 rotating in the correct direction, thereby rendering the delivery process smooth.

In this embodiment, the base 110 further comprises a sensing unit 114 centrally disposed at the load-carrying surface 112 to detect the weight of the liquid barrel 2 which contains therein residual chemical liquid. The sensing unit 114 is a conventional spring scale, load gauge capable of generating digital or electronic signals, strain gauge or piezoelectric component. When the load-carrying surface 112 carries the liquid barrel 2, the sensing unit 114 deforms physically or generates an electronic signal to inform the liquid withdrawal system 1 or the users of the current weight of the liquid barrel 2, so as to facilitate the process of liquid withdrawal or demounting the liquid barrel 2. In a variant embodiment, not only does the base 110 dispense with the sensing unit 114, but the positions and numbers of constituent elements of the liquid withdrawal system are also subject to changes to suit the appearance of the liquid barrel 2.

In addition, to prevent the liquid barrel 2 from falling off the base 110 because of the rotation of the base 110 or for any other reason, the grip elements 130 are symmetrically disposed at the periphery of the base 110 to grip the liquid barrel 2. In this embodiment, the liquid withdrawal system 1 further comprises a plurality of screws 160. The screws 160 correspond in quantity to the grip elements 130 and are arranged radially on the base 110. The grip elements 130 each comprise a central portions 132 and a plurality of end portions 134. The end portions 134 are connected to each other by the central portions 132, respectively. The screws 160 are connected to the base 110 and the central portions 132. As shown in FIG. 4, the rotational axis X is equidistant from the grip elements 130, such that the grip elements 130 fastened to the screws 160 move toward and away from the rotational axis X.

The end portions 134 each have a rotating element 136. The rotating elements 136 are, for example, rollers or sleeves, have a height difference H relative to the load-carrying surface 112, and are pivotally connected to the end portions 134, respectively, to abut against and grip the body of the liquid barrel 2. Referring to FIG. 4, the base 110 has a center C, such that the distance between each central portion 132 and the center C is less than the distance between each end portion 134 and the center C. Therefore, when the screws 160 rotate, the central portions 132 connected to the screws 160 enter the inside of the bottom of the base 110, whereas the rotating elements 136 disposed on the end portions 134 disposed outside the base 110 retract inward radially and abut against the body of the liquid barrel 2.

Figure 5:
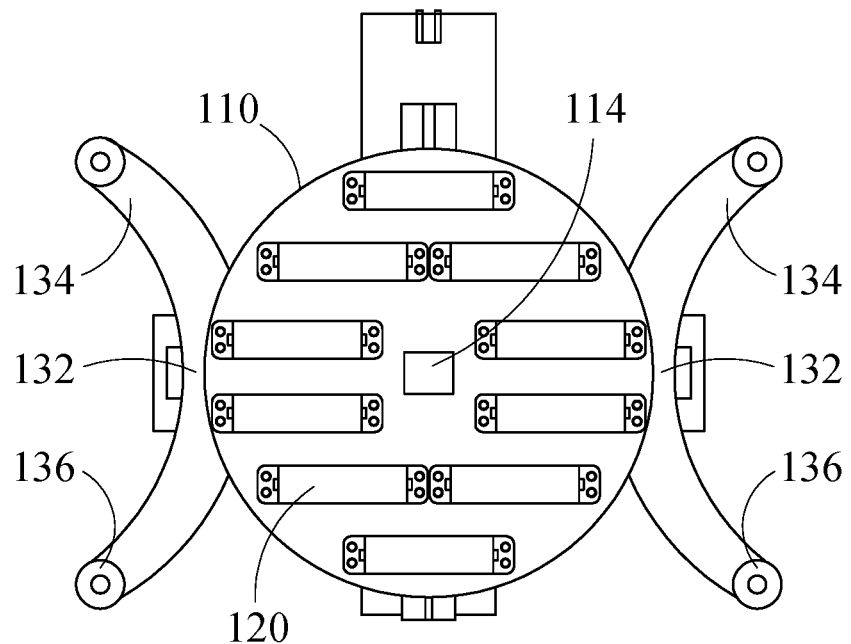
FIG. 5 is a top view of how the underlying elements shown in FIG. 3 function as the grip elements and fan out relative to the base.
Figure 6:
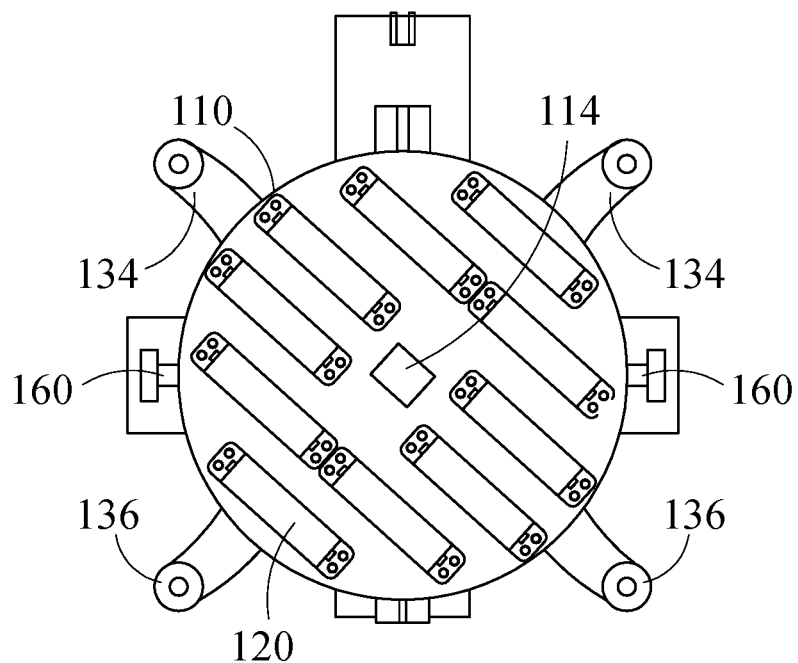
FIG. 6 is a top view of how the underlying elements shown in FIG. 5 function as the grip elements and close in relative to the base while the base rotates.

The description below is about how the grip elements 130 grip the liquid barrel 2. Refer to FIG. 5 and FIG. 6. FIG. 5 is a top view of how the underlying elements shown in FIG. 3 function as the grip elements and fan out relative to the base. FIG. 6 is a top view of how the underlying elements shown in FIG. 5 function as the grip elements and close in relative to the base while the base rotates. To move the liquid barrel 2, the users rest part of the liquid barrel 2 on the load-carrying surface 112, such that the grip elements 130 fan out relative to the base 110 as shown in FIG. 5. Then, the users rotate the screws 160 to move the grip elements 130 corresponding in position to the resting part of the liquid barrel 2. Consequently, the rotating elements 136 abut against the liquid barrel 2 and thereby are temporarily gripped in place. After the liquid barrel 2 has rotatably moved to a predetermined position with the motion-enhancing element 120 and the base 110, all the grip elements 130 close in until all the rotating elements 136 abut against the body of the liquid barrel 2, as shown in FIG. 6. Therefore, the liquid barrel 2 is gripped with the rotating elements 136 from all directions relative to the base 110 and thus is unlikely to fall off the base 110 under any external force or for any other reason. Furthermore, with the rotating elements 136 being capable of rotating in accordance with the curvature of the body of the liquid barrel 2, pressure-induced deformation of the body of the liquid barrel 2, which might otherwise occur when the aforesaid elements are in contact with the soft barrel body, is reduced. Moreover, even if the liquid barrel 2 comes in different specifications and sizes, the grip elements 130 can close in and thus cause the center of the liquid barrel 2 to move to a predetermined position; consequently, specifications and sizes of the liquid barrel 2 do not pose a problem.

Figure 7:
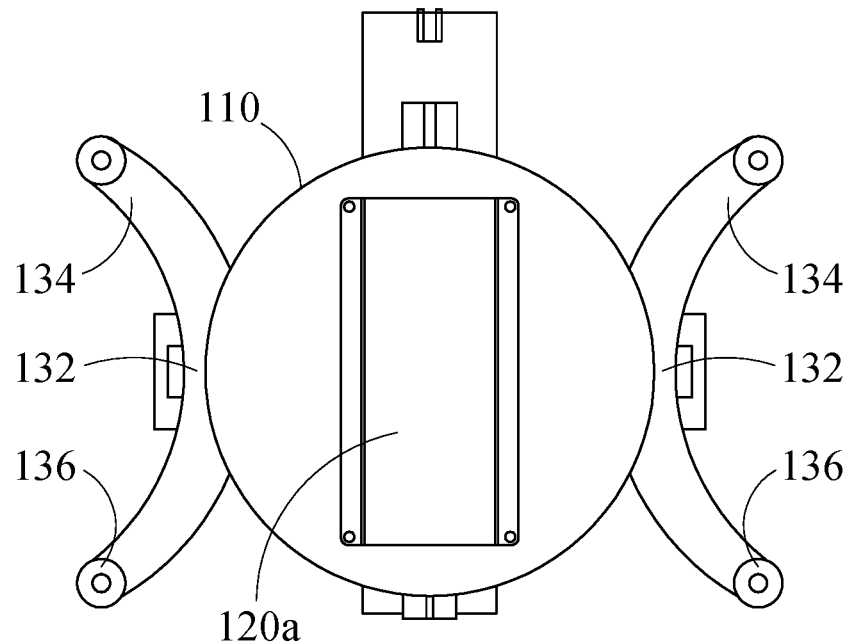
FIG. 7 is a top view of how the underlying elements of the liquid withdrawal system function as the grip elements and fan out relative to the base according to another embodiment of the present disclosure.
Figure 8:
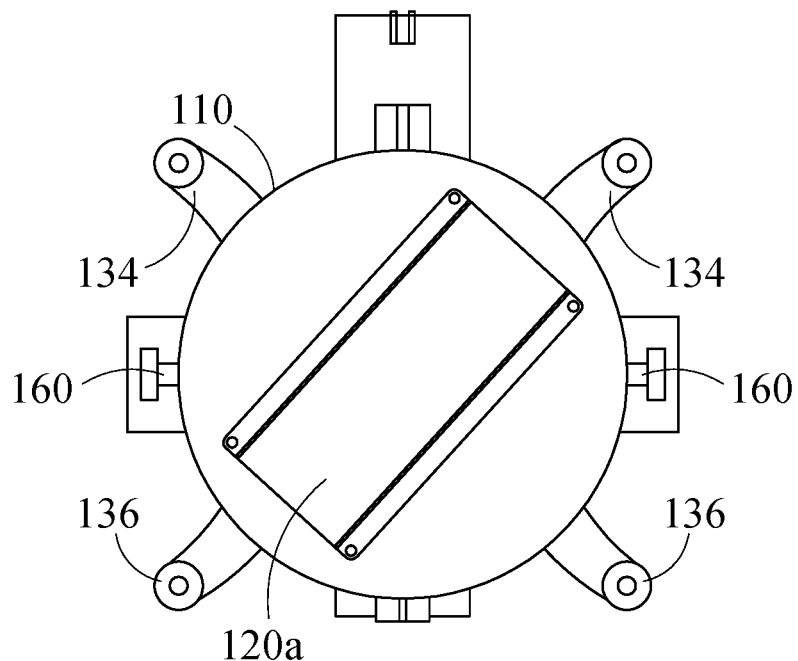
FIG. 8 is a top view of how the grip elements shown in FIG. 7 close in relative to the base while the base is rotating.
Figure 9:
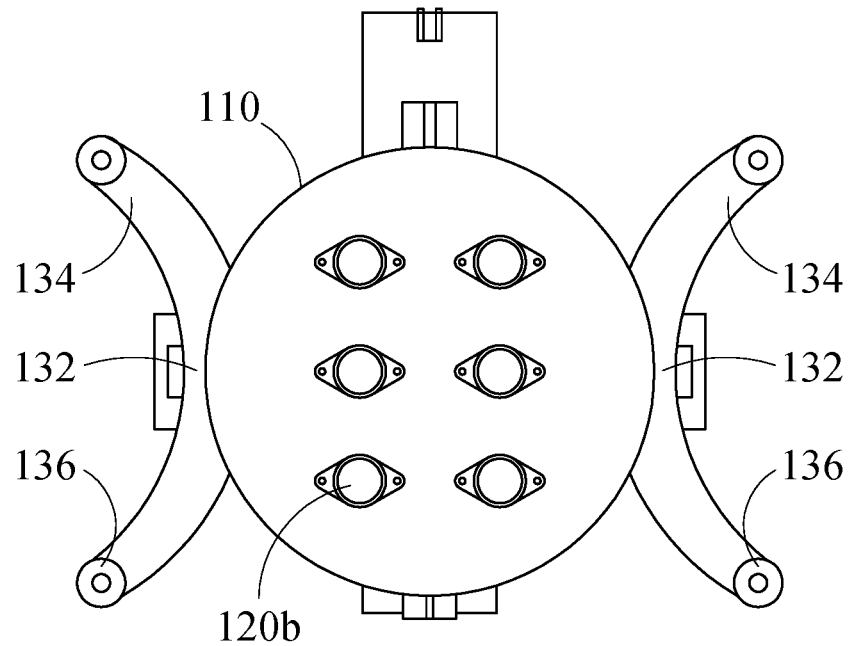
FIG. 9 is a top view of how the underlying elements of the liquid withdrawal system function as the grip elements and fan out relative to the base according to yet another embodiment of the present disclosure.
Figure 10:
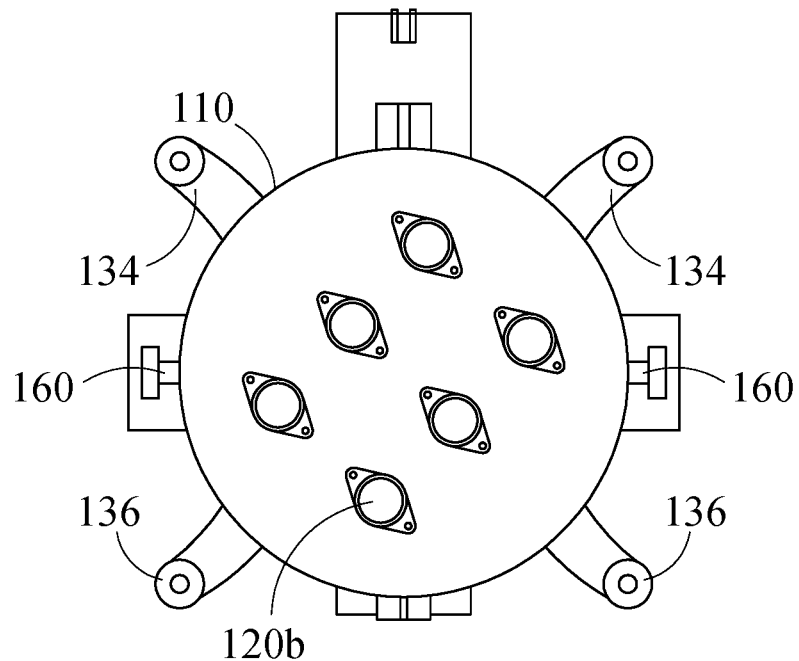
FIG. 10 is a top view of how the grip elements shown in FIG. 9 close in relative to the base while the base is rotating.

Refer to FIG. 7 through FIG. 10. FIG. 7 is a top view of how the underlying elements of the liquid withdrawal system function as the grip elements and fan out relative to the base according to another embodiment of the present disclosure. FIG. 8 is a top view of how the grip elements shown in FIG. 7 close in relative to the base while the base is rotating. FIG. 9 is a top view of how the underlying elements of the liquid withdrawal system function as the grip elements and fan out relative to the base according to yet another embodiment of the present disclosure. FIG. 10 is a top view of how the grip elements shown in FIG. 9 close in relative to the base while the base is rotating. In addition to the unidirectional roller, in a variant embodiment, the motion-enhancing element 120 can be of any other type, such as a caterpillar-aided motion-enhancing element 120a (shown in FIG. 7 and FIG. 8), an omnidirectional roller-aided motion-enhancing element 120b (shown in FIG. 9 and FIG. 10), a motion-enhancing element (not shown) laid on the load-carrying surface 112 through slender rolling elements, or a combination thereof, but the present disclosure is not limited thereto.

Figure 11:
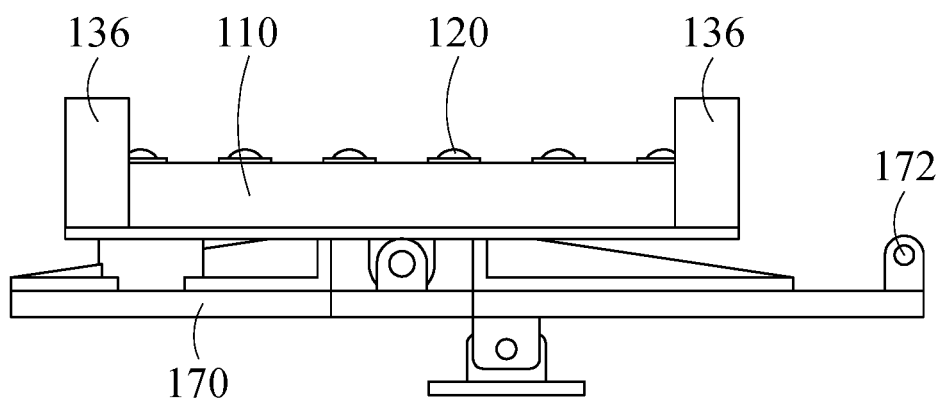
FIG. 11 is a lateral view of the underlying elements shown in FIG. 3.
Figure 12:
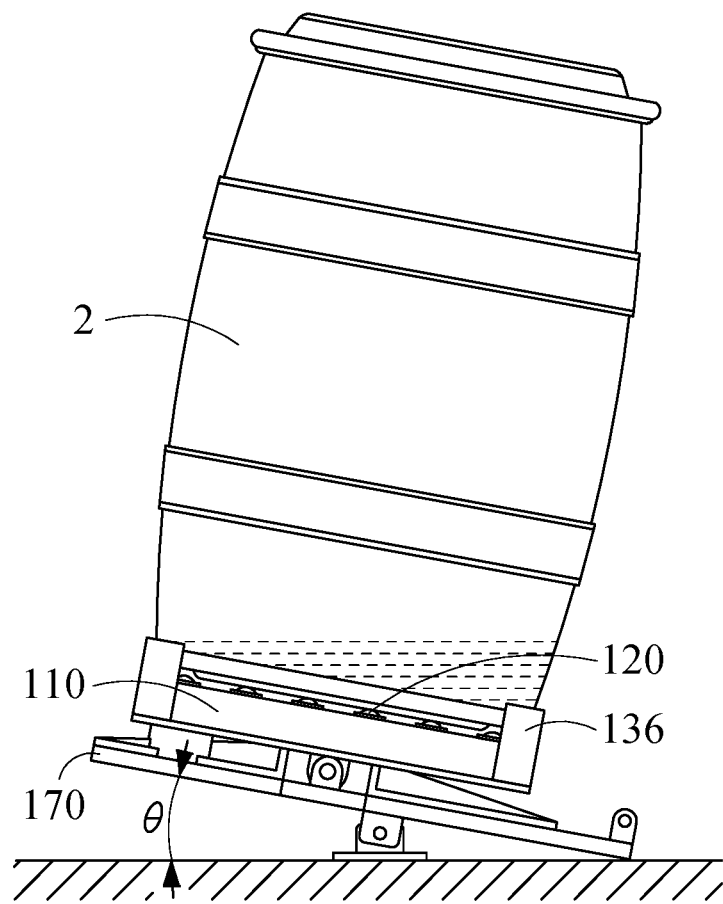
FIG. 12 is a schematic view of how the underlying elements shown in FIG. 11 carry the liquid barrel and tilt at an angle.

Refer to FIG. 11 and FIG. 12. FIG. 11 is a lateral view of the underlying elements shown in FIG. 3. FIG. 12 is a schematic view of how the underlying elements shown in FIG. 11 carry the liquid barrel and tilt at an angle. Regarding the liquid withdrawal system 1, when the clamp 140 clamps the barrel lid and withdraws liquid from the liquid barrel 2 to a certain extent, the level of the remaining liquid in the liquid barrel 2 drops until it is not accessible by the liquid withdrawal apparatus positioned in the liquid barrel 2. To solve these problems, this embodiment provides the liquid withdrawal system 1 which further comprises an inclination mechanism 170. The inclination mechanism 170 is pivotally connected to the ground, and the base 110 is disposed on the inclination mechanism 170.

Referring to FIG. 11, a connection portion 172 is disposed at one end of the inclination mechanism 170 and connected to a support rod (not shown) which presses the inclination mechanism 170 from above. The base 110 is disposed on a part of the inclination mechanism 170, and the part of the inclination mechanism 170 is positioned distal to one end of the connection portion 172. In the course of liquid withdrawal, when the liquid withdrawal system 1 or the users is informed by the sensing unit 114 of the fact that residual chemical liquid in the liquid barrel 2 has decreased to a certain amount, the users can press the support rod connected to the connection portion 172 downward, such that the inclination mechanism 170 rotates pivotally, thereby allowing one end of the connection portion 172 to move downward and come into contact with the ground. When one end of the connection portion 172 is in contact with the ground, the base 110, the inclination mechanism 170 and the bottom surface of the liquid barrel 2 on the base 110 are oblique to the ground at an angle θ. Therefore, residual liquid in the liquid barrel 2 gathers at a point of the bottom of the liquid barrel 2 to allow the liquid withdrawal system 1 to withdraw all the residual liquid. Practical measurement shows that, when the angle θ ranges from 5 to 10 degree, the liquid withdrawal system 1 withdraws all the remaining liquid effectively, so as to prevent the liquid barrel 2 from toppling because of an excessively great inclination angle.

While the present disclosure has been described by means of specific embodiments, numerous modifications and variations could be made thereto by those skilled in the art without departing from the scope and spirit of the present disclosure set forth in the claims.

What is claimed is:

1. A liquid withdrawal system, comprising:
a base having a load-carrying surface and a rotational axis, wherein the rotational axis is perpendicular to the load-carrying surface, and the base is rotatable relative to the rotational axis;
at least one motion-enhancing element disposed on the load-carrying surface;
a plurality of grip elements movably connected to the base and symmetrically positioned relative to the base;
a clamp disposed opposite the load-carrying surface, wherein the base and the clamp jointly define a receiving space adapted to receive a liquid barrel; and
a plurality of screws arranged radially on the base, wherein the rotational axis is positioned in the direction of extension of the plurality of screws,
wherein the plurality of grip elements each comprise a central portion and a plurality of end portions, the plurality of screws being connected to the base and the central portions, wherein the distance between each said central portion and a center of the base is less than the distance between each said end portion and the center, wherein each said end portion has a rotating element, and each said rotating element has a height difference relative to the load-carrying surface.

2. The liquid withdrawal system of claim 1, wherein the at least one motion-enhancing element is a unidirectional roller, omnidirectional roller, rolling element or caterpillar.

3. The liquid withdrawal system of claim 1, further comprising a limiting element connected to the base and the clamp and corresponding in shape to the liquid barrel.

4. A liquid withdrawal system, comprising:
a base having a load-carrying surface and a rotational axis, the rotational axis being perpendicular to the load-carrying surface, and the base being rotatable relative to the rotational axis;
at least one motion-enhancing element disposed on the load-carrying surface;
a plurality of grip elements movably connected to the base and symmetrically positioned relative to the base; and
a plurality of screws arranged radially on the base, wherein the rotational axis is positioned in the direction of extension of the plurality of screws,
wherein the plurality of grip elements each comprise a central portion and a plurality of end portions, the plurality of screws are connected to the base and the central portions, wherein the distance between each said central portion and a center of the base is less than the distance between each said end portion and the center, wherein each said end portion has a rotating element, and each said rotating element has a height difference relative to the load-carrying surface.

5. The liquid withdrawal system of claim 4, further comprising an inclination mechanism pivotally connected to the ground, wherein the base is disposed on the inclination mechanism.

6. The liquid withdrawal system of claim 5, wherein an end of the inclination mechanism has a connection portion, wherein the base is disposed on the inclination mechanism and positioned distal to the end thereof, wherein the base and the inclination mechanism are oblique to the ground at an angle when the end is in contact with the ground.

7. The liquid withdrawal system of claim 4, wherein the load-carrying surface is adapted to carry a liquid barrel, and the base further comprises a sensing unit, wherein the sensing unit deforms physically or generates an electronic signal as soon as the load-carrying surface carries the liquid barrel.

8. The liquid withdrawal system of claim 4, further comprising a limiting element connected to the base and corresponding in shape to the liquid barrel, wherein the load-carrying surface is adapted to carry a liquid barrel.

* * * * *